United States Patent
Ke et al.

(10) Patent No.: US 7,914,938 B2
(45) Date of Patent: Mar. 29, 2011

(54) FLAT FUEL CELL COMBINING A RUNNER PLATE AND CONDUCTING LAYER

(75) Inventors: Shih-Tsung Ke, Siaying Township, Tainan County (TW); Tsong-Pyng Perng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 930 days.

(21) Appl. No.: 11/760,752

(22) Filed: Jun. 9, 2007

(65) Prior Publication Data

US 2008/0305381 A1    Dec. 11, 2008

(51) Int. Cl.
*H01M 8/10* (2006.01)
(52) U.S. Cl. .......... 429/463; 429/517; 429/518
(58) Field of Classification Search .......... None
See application file for complete search history.

(56) References Cited

U.S. PATENT DOCUMENTS

| | | | | |
|---|---|---|---|---|
| 5,972,530 A | * | 10/1999 | Shelekhin et al. | 429/413 |
| 6,703,155 B2 | * | 3/2004 | Scartozzi | 429/437 |
| 7,326,485 B2 | * | 2/2008 | Yoshida et al. | 429/434 |

* cited by examiner

*Primary Examiner* — John S Maples
(74) *Attorney, Agent, or Firm* — Egbert Law Offices PLLC

(57) ABSTRACT

The present invention relates to a flat fuel cell combining runner plates and a conducting layer. The flat fuel cell includes two runner plates and a conducting layer between the runner plates. There are conducting blocks embedded into the predefined locations on the assembly surfaces of two runner plates. A concave flow passage is shaped by the assembly surfaces of runner plates and the conducting blocks, thus providing a unique structure combining the runner plates and conducting layer. The conducting blocks are electrically connected through the contact of convex flanges on the conducting blocks. Thus, the flat fuel cells are developed thin, making it possible to greatly reduce manufacturing assembly costs without the need of electric wires and to achieve better economic efficiency and applicability.

3 Claims, 6 Drawing Sheets

FLAT FUEL CELL COMBINING A RUNNER PLATE AND CONDUCTING LAYER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a fuel cell, and more particularly to an innovative fuel cell combining a runner plate and conducting layer.

2. Description of Related Art Including Information Disclosed Under 37 CFR 1.97 and 37 CFR 1.98

A fuel cell is mainly composed of a membrane electrode assembly, a runner plate and a conducting layer.

The membrane electrode assembly (MEA) is used to generate electric energy through chemical reaction of hydrogen and oxygen. The runner plate provides a space for guiding flow of hydrogen and oxygen, and the conducting layer permits conduction of the electric energy generated by the membrane electrode assembly.

The membrane electrode assembly, runner plate and conducting layer of a typical fuel cell are individual components that are combined to form a fuel cell via predefined means (e.g. overlapping, embedding, hot pressing). According to Taiwan Patent No. I 251954, entitled "Flat Fuel Cell, Fuel Cell Components and Manufacturing Methods", a net like conducting layer is incorporated onto the surface of the membrane electrode assembly. However, in application, some technical bottlenecks will be encountered owing to the thickness and volume of the fuel cell components, which do not favor a thin profile. In addition, the assembly process of the components cannot be simplified, posing a barrier to the development and mass production of thin profile fuel cells.

After electric energy is generated by the membrane electrode assemblies of a typical fuel cell, a complex electric circuit shall be still required for power transmission, leading to time consuming assembly and higher manufacturing costs with poor efficiency.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

In the present invention, the runner plates are combined with the conducting layer, such that fuel cells can be developed as flat and thin for easier implementation.

The runner plates of the present invention also have conducting blocks embedded by injection molding. As such, the assembly process is simplified, efficiently reducing manufacturing costs and achieving better economic efficiency.

These conducting blocks of the runner plates are electrically connected through overlapping of a convex flange. The flange eliminates the need for assembly of complex electric wires, helping to significantly reduce assembly cost with better economic efficiency.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
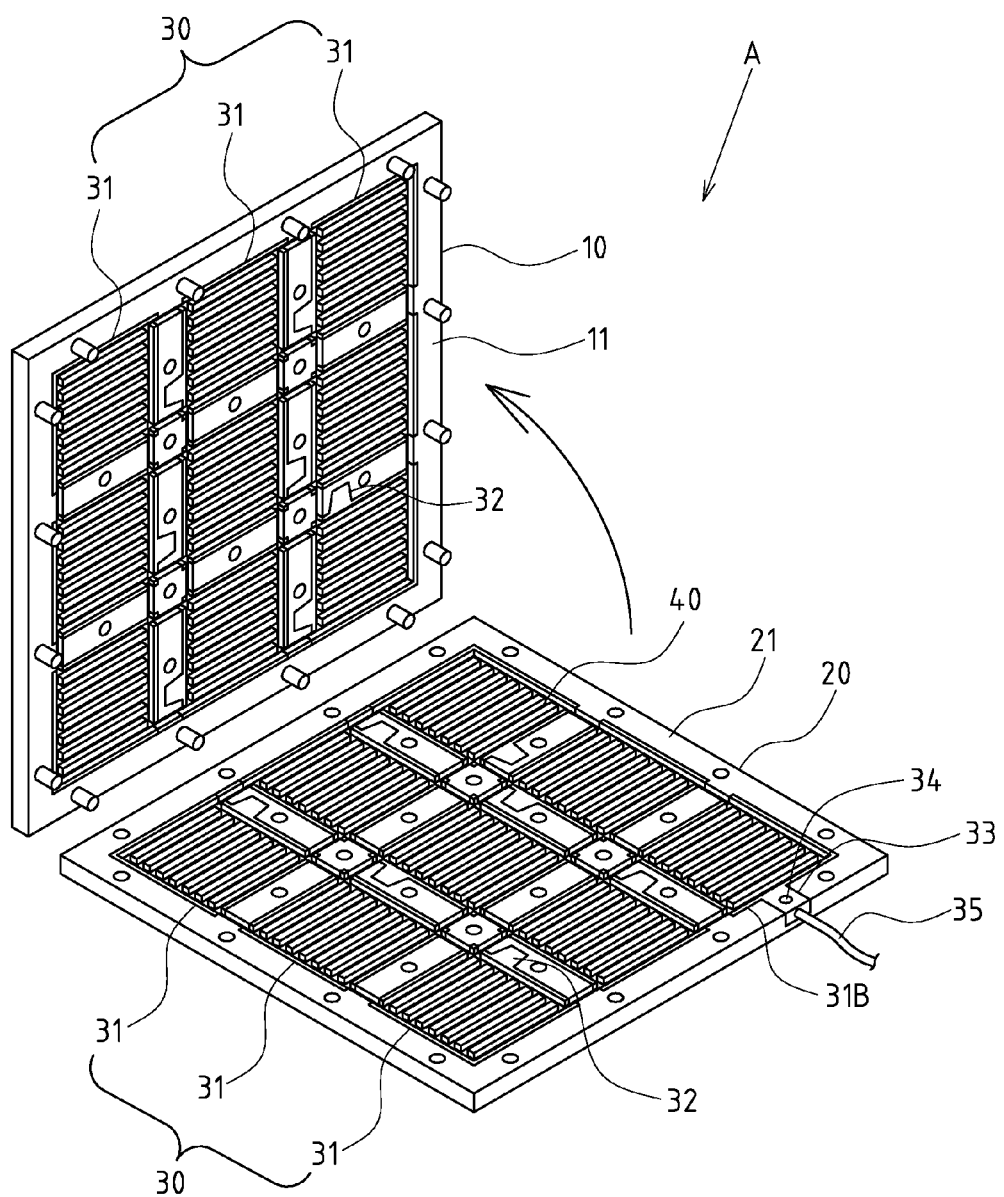
FIG. 1 shows an exploded perspective view of the preferred embodiment of the present invention.
Figure 2:
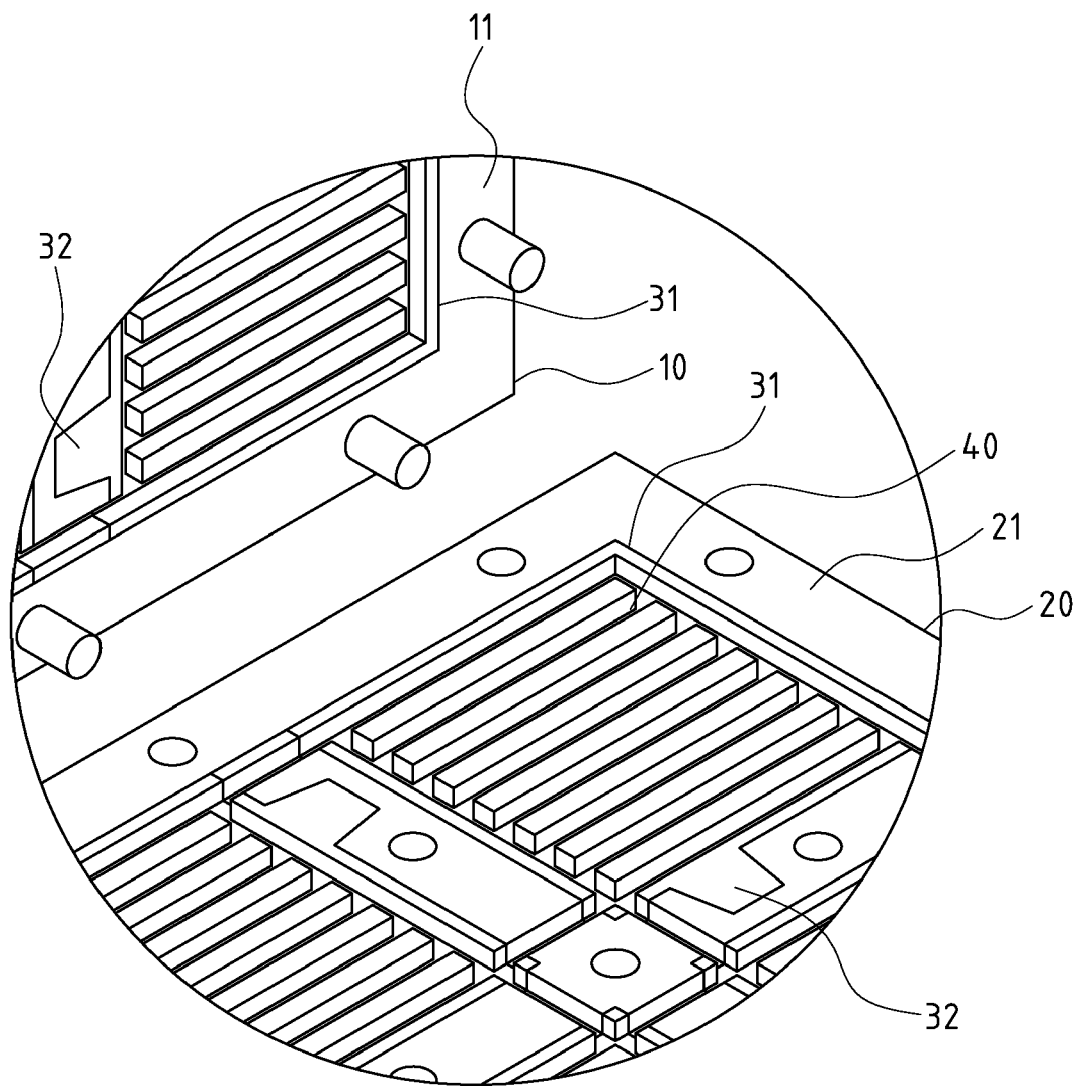
FIG. 2 shows a partially enlarged perspective view of FIG. 1.
Figure 3:
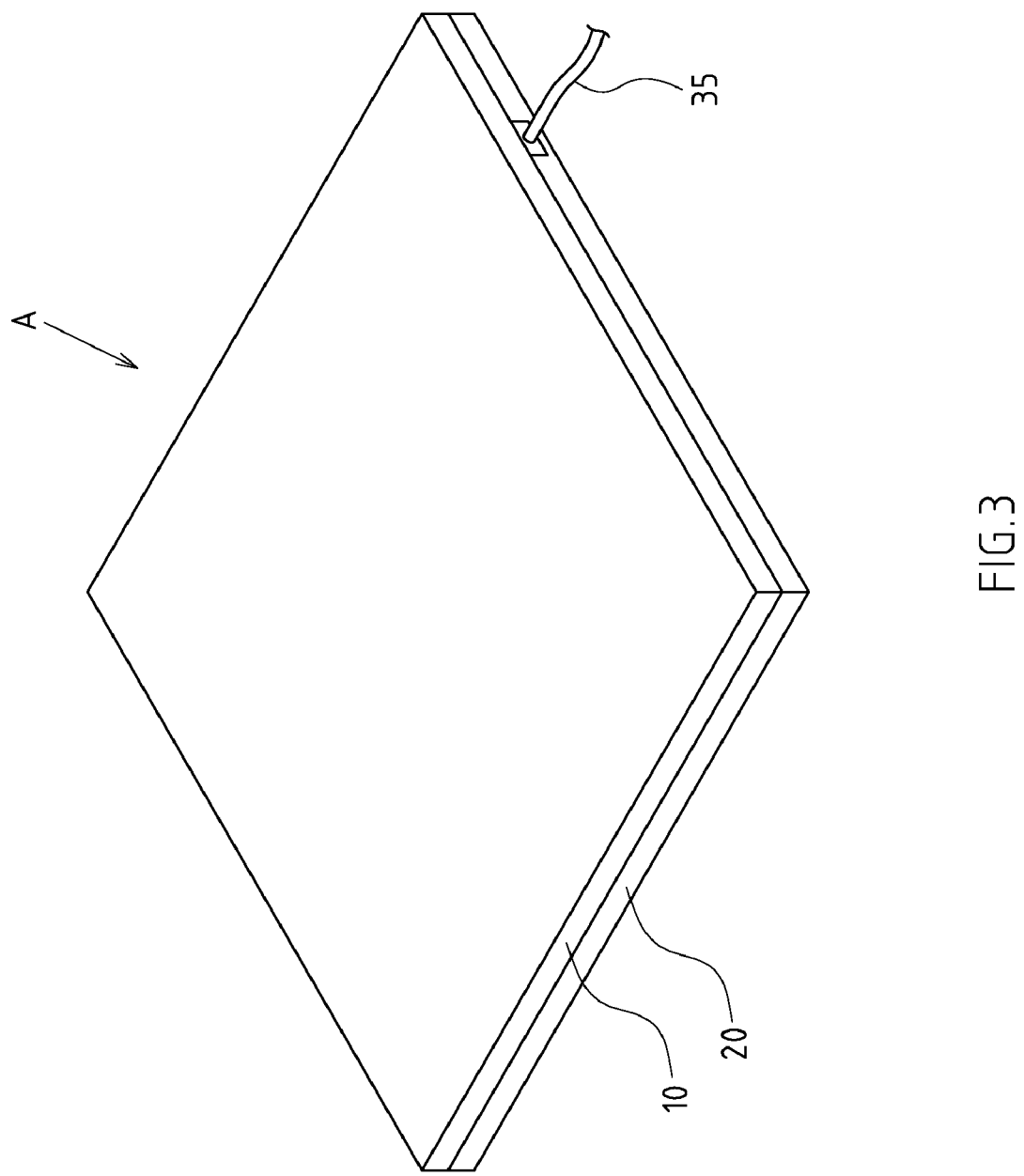
FIG. 3 shows a perspective view of the assembled preferred embodiment of the present invention.
Figure 4:
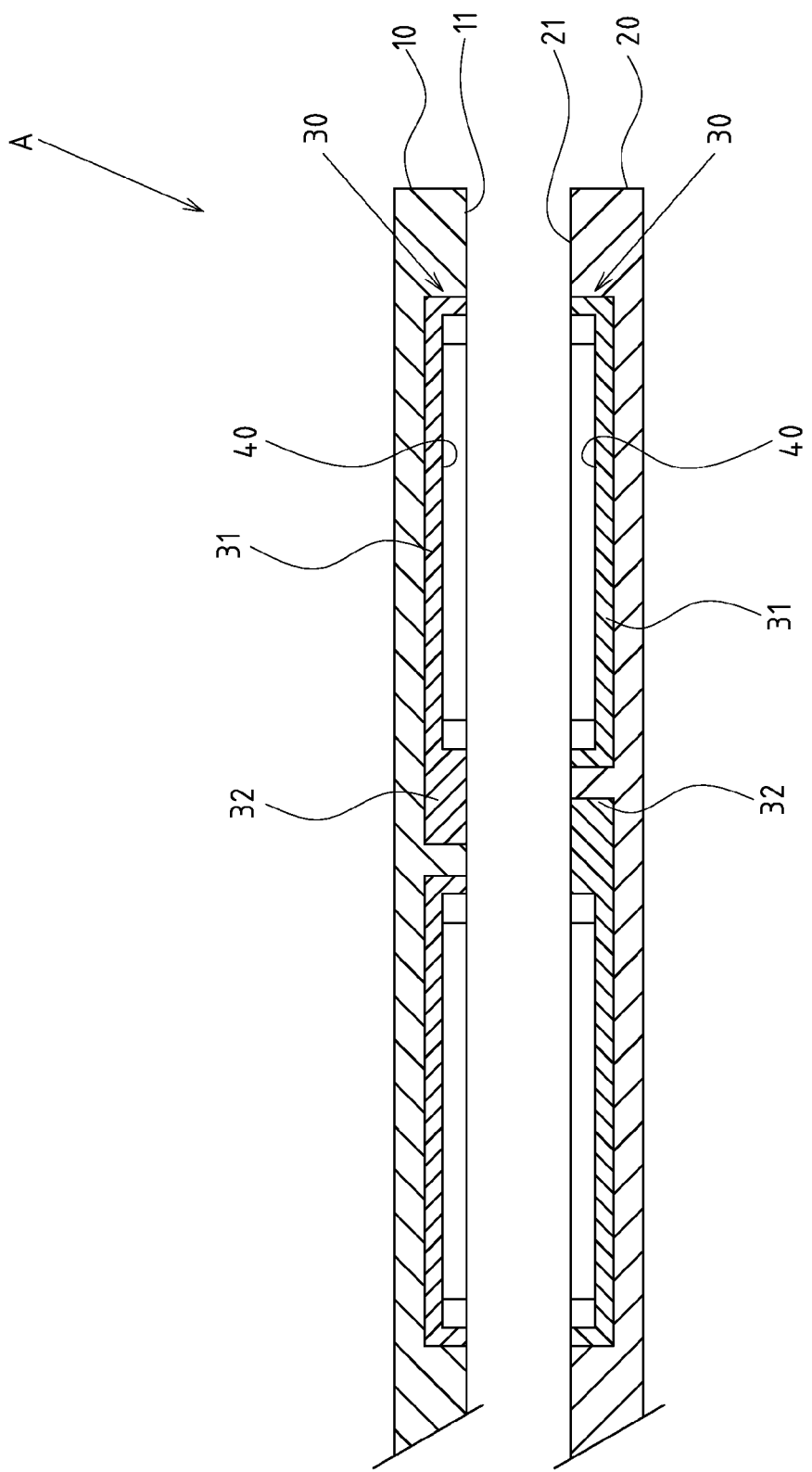
FIG. 4 shows a partial exploded sectional view of the preferred embodiment of the present invention.

The features and the advantages of the present invention will be more readily understood upon a thoughtful deliberation of the following detailed description of a preferred embodiment of the present invention with reference to the accompanying drawings.

FIGS. 1, 2, 3, 4, and 5 depict a preferred embodiment of improved structure of a fuel cell combining the runner plate and conducting layer. The preferred embodiment is provided for explanatory purposes only.

The fuel cell A comprises two runner plates 10, 20 and a conducting layer 30 between these two runner plates 10, 20.

Conducting blocks 31 are embedded into predefined locations on the assembly surfaces 11, 21 of the two runner plates 10, 20. A concave flow passage 40 (e.g. groove) for gas supply (e.g. hydrogen, oxygen) is shaped by the assembly surfaces 11, 21 of runner plates 10, 20 and the conducting blocks 31, thus providing a unique structure combining the runner plates 10, 20 and conducting layer 30.

Figure 5:
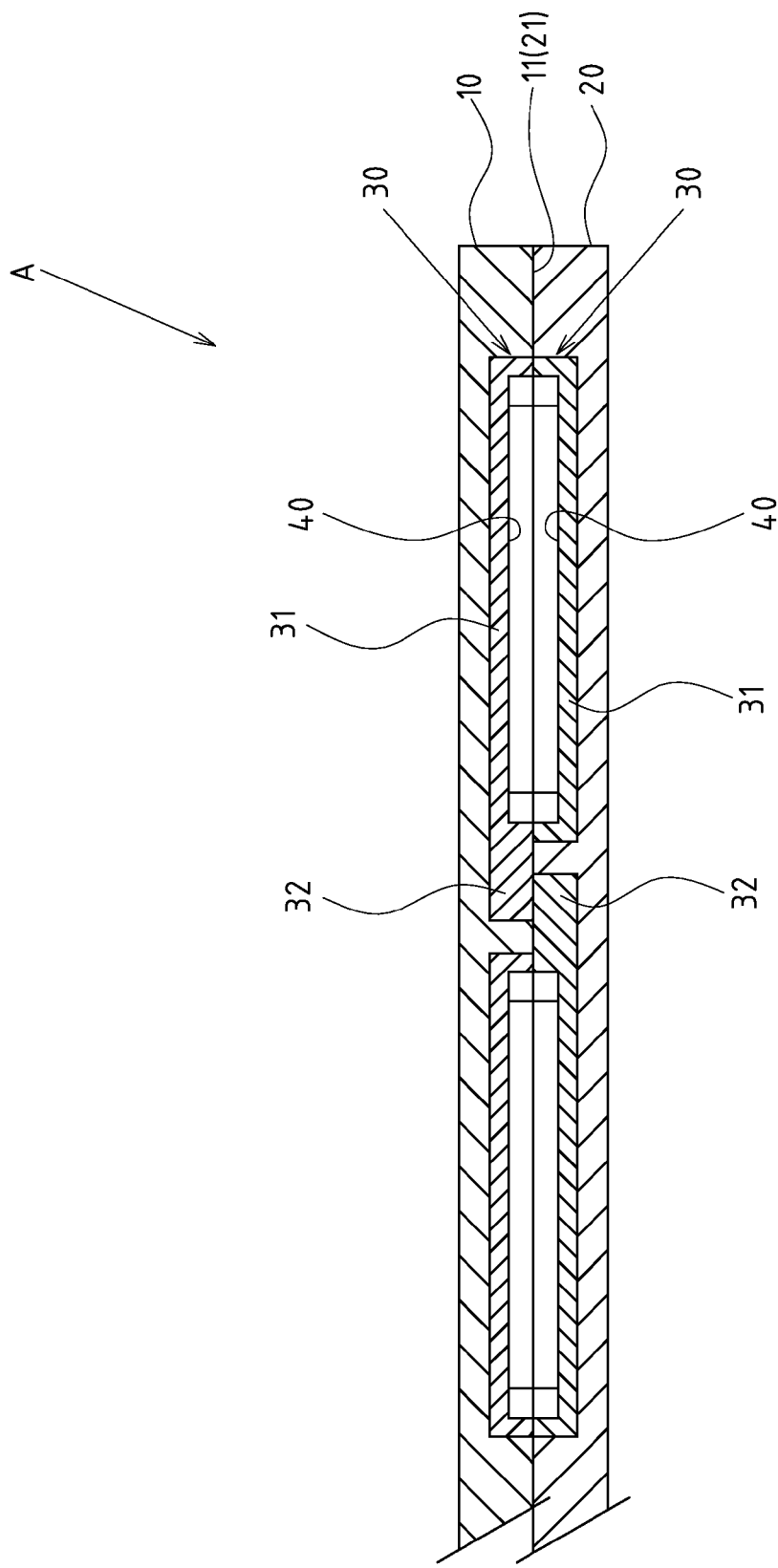
FIG. 5 shows a partial sectional view of the assembled preferred embodiment of the present invention.
Figure 6:
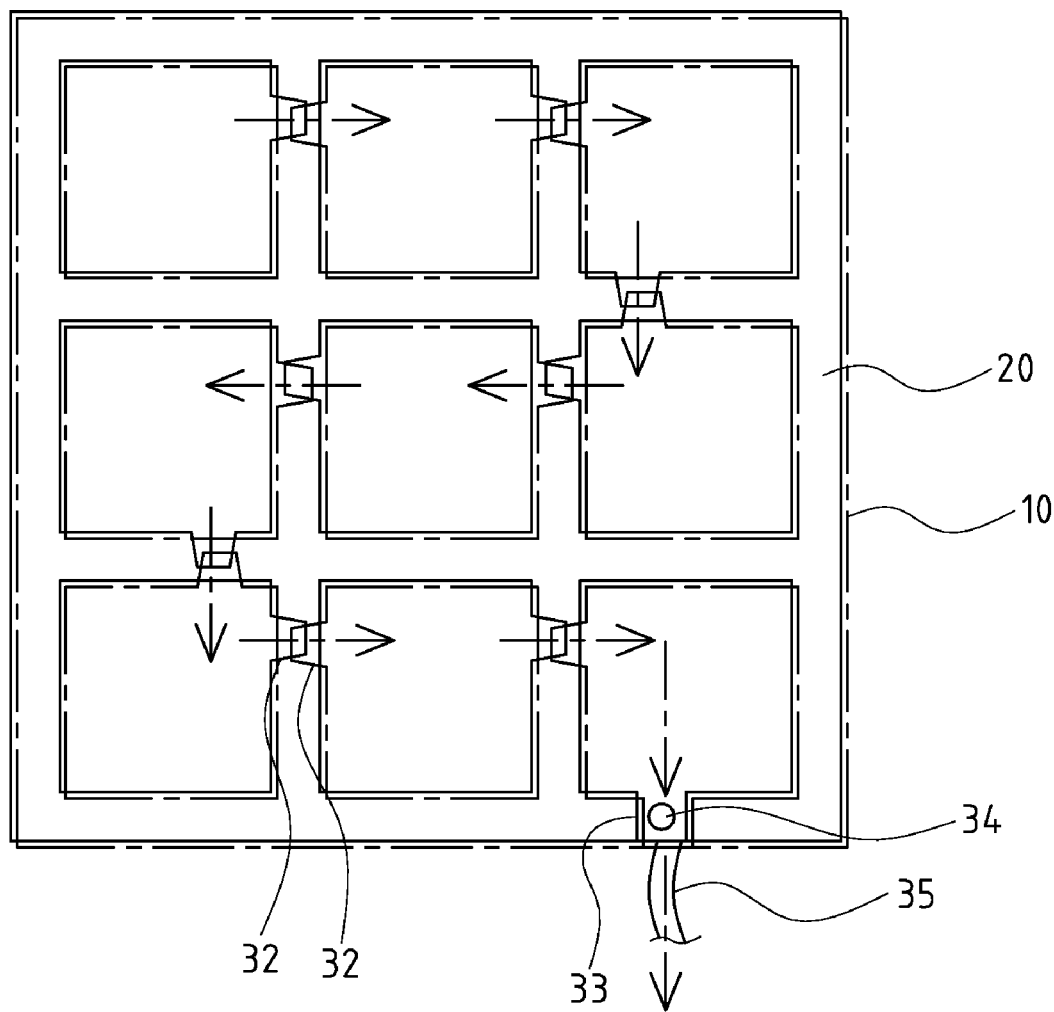
FIG. 6 shows a schematic view of the present invention with two runner plates electrically connected to the conducting layer. The two runner plates shown are actually overlapped.

A plurality of conducting blocks 31 are arranged at intervals on the assembly surfaces 11, 21 of runner plates 10, 20, and convex flanges 32 are shaped at one side of the conducting blocks 31. The conducting blocks 31 of the two runner plates 10, 20 are electrically connected through overlapping the convex flanges 32, as shown in FIGS. 5 and 6.

The conducting blocks 31 are embedded into the runner plates 10, 20 by injection molding.

An electric output portion 33, protruding outside of either runner plate 10 or 20, is shaped from a conducting block 31B at the edge of runner plates 10, 20. The electric output portion 33 is provided with an electric connection hole 34 to connect the preset electric wire 35 and output the electric energy generated by the fuel cell A.

Based upon the above specified structures of the present invention, the conducting blocks 31 are embedded into the assembly surfaces 11, 21 of two runner plates 10, 20. As such, it should be possible to combine the runner plates 10, 20 and the conducting layer 30. Thus, the flow passage 40 is assembled onto the combined structure of assembly surfaces 11, 21 of runner plates 10, 20 and the conducting block 31. On the other hand, when two runner plates 10, 20 are mated together to permit the contact of two assembly surfaces 11, 21, the conducting blocks 31 of two runner plates 10, 20 electrically connect through overlapping of the convex flanges 32, as shown in FIGS. 5 and 6. Referring to FIG. 6, the conducting blocks 31 are arranged in rectangular blocks, while the electric path formed from the convex flange 32 is characterized by an S-shape, indicated by the path shown by the arrow. The electric energy is finally output by the electric output portion 33 formed from conducting block 31B at the edge of the runner plate 10.

We claim:

1. A flat fuel cell comprising:
   a pair of runner plates each having an assembly surface; and
   a conducting layer positioned between said pair of runner plates, said conducting layer having a first plurality of conducting blocks embedded on the assembly surface of one of said pair of runner plates and a second plurality of conducting blocks embedded on the assembly surface of the other of said pair of runner plates, said first and second pluralities of conducting blocks forming concave flow passages between said pair of runner plates, the conducting blocks of said first plurality of conducting blocks being in spaced relationship to each other, the conducting blocks of said second plurality of conducting blocks being in spaced relation to each other, each of said conducting blocks of said first and second pluralities of conducting blocks having a convex flange extending outwardly from one side thereof, the convex flange of one of the conducting blocks being electrically connected to the convex flange of an adjacent conducting block of said first and second pluralities of conducting blocks so as to form an S-shaped electrical flow pathway along said first and second conducting blocks.

2. The flat fuel cell of claim 1, further comprising:
   an electric output portion extending outwardly of said pair of runner plates, said electric output portion electrically connected to one of the conducting blocks at an edge of said pair of runner plates.

3. The flat fuel cell of claim 2, said electric output portion having an electric connection hole.

* * * * *